United States Patent
Nain et al.

(10) Patent No.: US 7,411,925 B2
(45) Date of Patent: Aug. 12, 2008

(54) NETWORK ROUTE PROCESSOR USING STATE-BASED SWITCHOVER

(75) Inventors: Vijay Nain, Sunnyvale, CA (US); Chia Tsai, Cupertino, CA (US); Ajit Sanzgiri, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 515 days.

(21) Appl. No.: 10/986,625

(22) Filed: Nov. 12, 2004

(65) Prior Publication Data
US 2006/0002343 A1 Jan. 5, 2006

Related U.S. Application Data

(60) Provisional application No. 60/585,192, filed on Jul. 2, 2004.

(51) Int. Cl.
*H04Q 7/00* (2006.01)
(52) U.S. Cl. ........................ 370/329; 370/219; 370/338; 370/392; 455/450; 455/451; 455/452.1; 455/452.2; 455/453; 714/4; 714/10; 714/11
(58) Field of Classification Search ................. 370/338, 370/219, 329, 392; 455/450–453; 714/4, 714/11, 10
See application file for complete search history.

(56) References Cited

U.S. PATENT DOCUMENTS 5,473,599 A * 12/1995 Li et al. ...................... 370/219
5,835,696 A * 11/1998 Hess ............................ 714/10
7,010,715 B2 * 3/2006 Barbas et al. ................. 714/4
7,093,160 B2 * 8/2006 Lau et al. ..................... 714/11
7,136,383 B1 * 11/2006 Wilson ........................ 370/392
2004/0073642 A1 * 4/2004 Iyer ............................. 709/223

OTHER PUBLICATIONS

Cisco Systems, Inc., "Cisco Nonstop Forwarding and Timer Manipulation for Fast Convergence" (Paper Document), © 1991-2003, 13 pages.
Sullenberger, Mike; "Dynamic Multipoint IPsec VPNs (Using Multipoint GRE/NHRP to Scale IPsec VPNs)" Cisco Systems, Inc., 1992-2003.

* cited by examiner

*Primary Examiner*—Stephen M D'Agosta
(74) *Attorney, Agent, or Firm*—Trellis Intellectual Property Law Group, PC (57) ABSTRACT

Embodiments of the present invention provide for switchover from an active processor to a standby processor in a route processor system. An up-to-date copy of information used by a supervisor process at the active processor is ensured by determining necessary event states. One type of event state includes message requests, processing and replies. Three basic types of communication between three different entities (blade, wireless domain services (WDS) and supervisor) are governed by three types of communication protocols: WLCCP between a blade and WDS, LCP between a supervisor and a blade, and checkpoint-type messages between two supervisors.

20 Claims, 5 Drawing Sheets

NETWORK ROUTE PROCESSOR USING STATE-BASED SWITCHOVER

CLAIM OF PRIORITY

This invention claims priority from U.S. Provisional Patent application Ser. No. 60/585,192 filed on Jul. 2, 2004 which is hereby incorporated by reference as if set forth in full in this application.

RELATED APPLICATIONS

This application is related to U.S. patent application Ser. No. 10/992,943 entitled "INTERNET PROTOCOL AUTHENTICATION IN LAYER-3 MULTIPOINT TUNNELING FOR WIRELESS ACCESS POINTS" filed on Nov. 19, 2004 which is hereby incorporated by reference as if set forth in full in this application.

BACKGROUND OF THE INVENTION

This invention is related in general to digital networks and more specifically to the switchover from one processor to another in a route processor system by using state preservation to prevent packet loss.

Mobility networks, such as wireless networks, are a valuable alternative to fixed (e.g., wired) networks. Mobility networks provide advantages by allowing end users to move about freely, or roam, within a coverage area. Users can operate small portable devices such as laptops, personal digital assistants (PDAs), cell phones, etc., and still remain connected to a network such as the Internet, local area network (LAN), etc., at any point within the coverage area. Today's mobility networks are becoming better at quickly establishing a network connection and maintaining the network connection seamlessly as the user moves from one access point to another.

One critical single point of failure in a mobility network is the route processor. The route processor can include hardware components and software processes for creating and maintaining routing-table information for access points, user devices and other nodes in the network. The route processor is responsible for updating other routing devices or processes by providing routing table synchronization. If the route processor goes down (e.g., due to a malfunction) then the devices in a large part of the network can lose connection and have to re-establish their presence on the network by reconnecting, re-authenticating and possibly performing other steps.

One way to prevent connection loss due to route processor failure is to use two processors within a single route processor. A first, active, processor performs the route processor's functions and sends all routing table updates to a second, standby, processor, also within the route processor system. Upon failure of the active processor, control is turned over (a "switchover"), to the standby processor which then becomes the active processor. Although this approach helps to reduce the number of lost connections and other disruption to the network, the latency of performing routing table updates and other messaging and processing delays can mean that at the time of switchover the standby processor's routing table is not an exact copy of the active processor's routing table. In such cases, some connections may need to be reset in order to establish proper routing or other measures taken to ensure reliable and secure operation of the network.

SUMMARY OF EMBODIMENTS OF THE INVENTION

Embodiments of the present invention provide for switchover from an active processor to a standby processor in a route processor system in a mobility network. Control and data plan information of a distributed forwarding mobile network is preserved across a switchover. Event states are used to update information at a standby process or processor upon switchover. One type of event state includes message requests, processing and replies.

Control plane information includes mobility information and security credentials of wireless devices in the network. The control information is distributed among the network entities that include access points (APs), wireless domain services (WDS) and a level 3 mobility manager (L3MM), or "supervisor."

Communication types between different basic entities, WDS (or "blade"), APs and supervisors are governed by different communication protocols: WLCCP between a blade and APs, LCP between WDS and an active supervisor, and checkpoint messages between active and standby supervisors.

In one embodiment the invention provides a method for preserving mobility network connections in a route processor having first and second processes for performing routing functions, the method comprising using the first process to establish connections between devices in the mobility network; recording a plurality of route events as a plurality of states; initiating a switchover from the first process to the second process; using the states to reproduce routing information; reconnecting control messaging; and using the second process and the reproduced routing information to preserve the mobility network connections subsequent to initiating a switchover.

DETAILED DESCRIPTION OF EMBODIMENTS OF THE INVENTION

Figure 1:
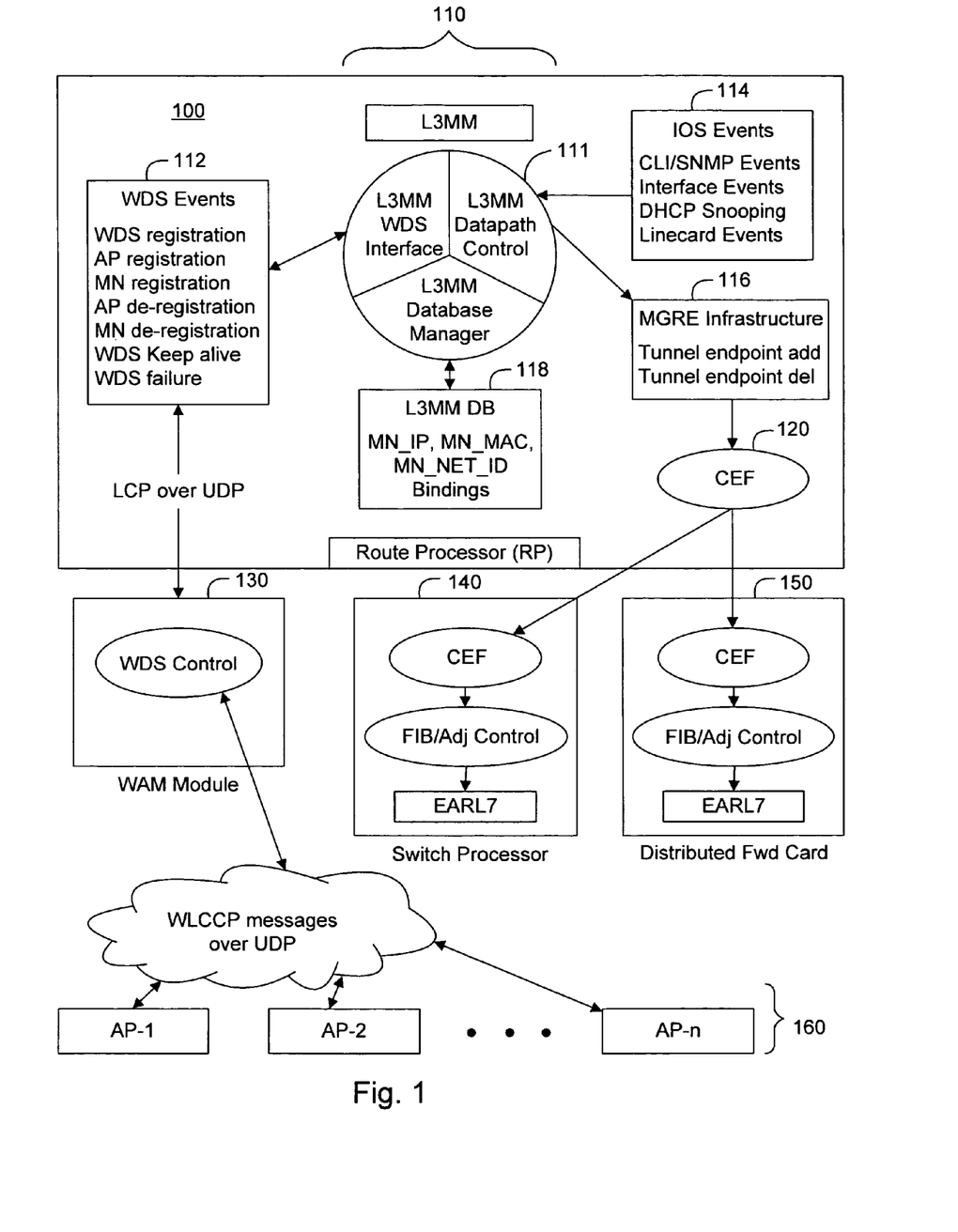
FIG. 1 shows an overview of network components suitable for use with embodiments of the invention.

FIG. 1 provides a general overview of network components suitable for use with embodiments of the invention. Note that other combinations of hardware and software can be used that vary from those of FIG. 1.

In a preferred embodiment, route device 100 is incorporated into a product manufactured by Cisco Systems, Inc., and referred to as the Catalyst™ series of route processors. Other embodiments can include features of the invention in other devices or in different types of devices. In the route device, datapath control functions are performed by a process referred to as the Layer 3 Mobility Manager (L3MM). Functions of the L3MM are illustrated at 111 and 118. The L3MM is used to maintain multi-point Generic Routing Encapsulation (mGRE) between route device 100 and APs at 160. The L3MM is also used to handle address bindings as illustrated at 118, to send machine address code (MAC) addresses for proxy ARP and to perform other functions.

In FIG. 1, APs 1-n at 160 are in communication with MNs (not shown). The control traffic containing device discovery information from the APs is sent via Wireless LAN Context Control Protocol (WLCCP) over User Datagram Protocol (UDP) to a wireless access module (WLSM) 130. Note that although specific protocols, standards or other mechanisms are discussed similar functionality can be provided in other ways and still be suitable for use with the present invention. WLSM includes WDS control for communication with the L3MM using Link Control Protocol (LCP) over UDP. WDS processing includes registration of devices and handling maintenance events.

L3MM provides a WDS interface that uses L3M Communication Protocol (LCP) to exchange information with WDS. This protocol runs on top of a UDP connection between a route processor (RP) and the WLSM module. APs in the wireless network register themselves as well as their associated MNs with the WDS. APs use WLCCP messages to exchange information with WDS module. On getting information about an AP or a MN, WDS sends that information to L3MM using LCP messages. L3MM processes these messages and updates its mobility database. In addition to these, L3MM and WDS exchange periodic heartbeat messages to ensure health of the communication channel between them.

An L3MM Database Manager is used to maintain a mobility database including information about each MN and AP that are registered with the WDS for L3 mobility. A database entry includes the MAC and IP addresses for the MN, the AP IP address and a wireless network ID. An entry is kept for each MN and is indexed by MN's MAC address. Other designs can use any suitable format for data structures and different numbers and types of information.

The mobility database can be updated as a result of an update from WDS or as a result of an IOS event that changes one of the above attributes of the MN.

The L3MM Data-path Control is responsible for establishing data path between the MN and Central Switch for centralized data forwarding. This component also listens to various IOS events and updates the data path accordingly. Various functions of this component include maintaining multi-point GRE tunnels between the Cat6k and the APs; learning MN MAC to IP_ADDR binding via DHCP snooping; and relaying CS MAC address to AP, so that AP can proxy ARP with CS's MAC address when MN does an ARP.

GRE/mGRE tunnel communication is used to facilitate MN and AP communications with CS and L3MM. Although GRE encapsulation is used in a preferred embodiment, other encapsulation (e.g., Multi-Protocol Label Switching (MPLS), etc.), tunneling, relaying or other communication techniques may be used in other embodiments. A GRE encapsulated packet includes a delivery header in IPv4 format. The delivery header is followed by a GRE header and a payload packet that is the subject of the encapsulation.

Multipoint GRE (mGRE) is an implementation of the GRE protocol. By configuring mGRE tunnels, a multipoint tunnel-.network is created as an overlay to the IP backbone network. The mGRE tunnel source and destinations belong to a logical IP subnet. In a peer-to-peer (p2p) GRE tunnel, there is only one fixed destination corresponding to the tunnel interface and hence one encapsulation ("encap") adjacency is created per interface. In an mGRE tunnel, multiple destinations/endpoints are added to the tunnel dynamically. For each mGRE tunnel, an encap adjacency is used for each endpoint on the logical IP subnet which receives traffic from the router. Unlike a p2p tunnel in which an encap adjacency is already installed when the tunnel is setup, an mGRE tunnel does not have any encap adjacencies when the tunnel is initially up. A glean adjacency (i.e., an adjacency that forwards all packets whose destination address matches the interface subnet to the software) is installed for the least specific tunnel logical IP subnet prefix when the mGRE tunnel is up. Packets destined for the tunnel interface that hit this glean adjacency will be sent to RP and get dropped. Later when the tunnel endpoint is discovered, the corresponding adjacency can then be created.

In a preferred embodiment, the data traffic between AP and CS is encapsulated in IP/GRE tunnel. By configuring the mGRE tunnel on CS, the overlay interconnects CS and Mobile Nodes logically to allow data traffic to flow over in both directions. MNs are tunnel endpoints. APs are used as the tunnel entry and termination point for all MNs belongs to it. The same underlay transport address (AP's IP address) can be used to reach multiple different mGRE tunnel endpoints (MNs that belong to that AP).

Figure 2:
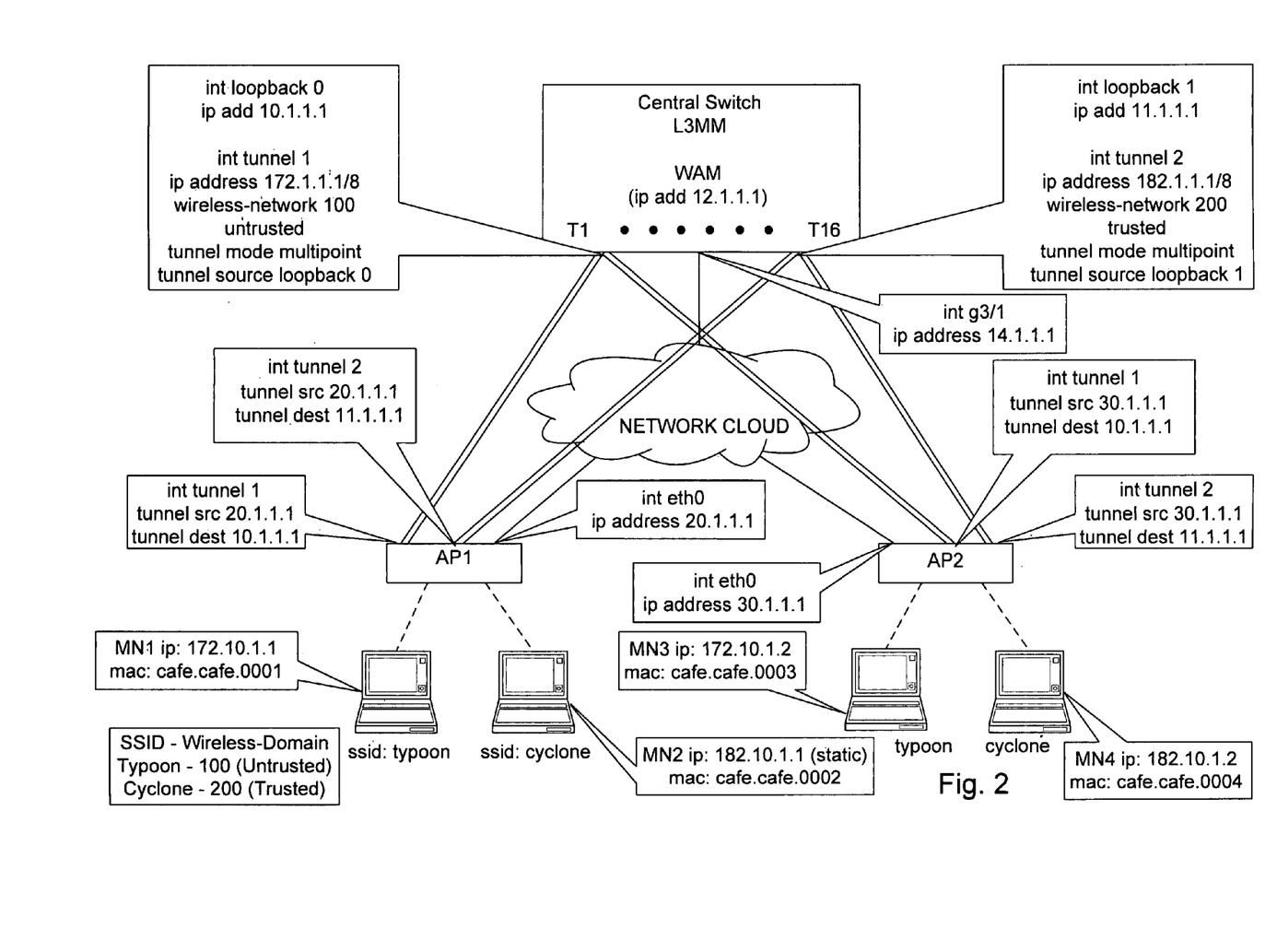
FIG. 2 shows a topology for a tunneling network according to an embodiment of the present invention.
Figure 3:
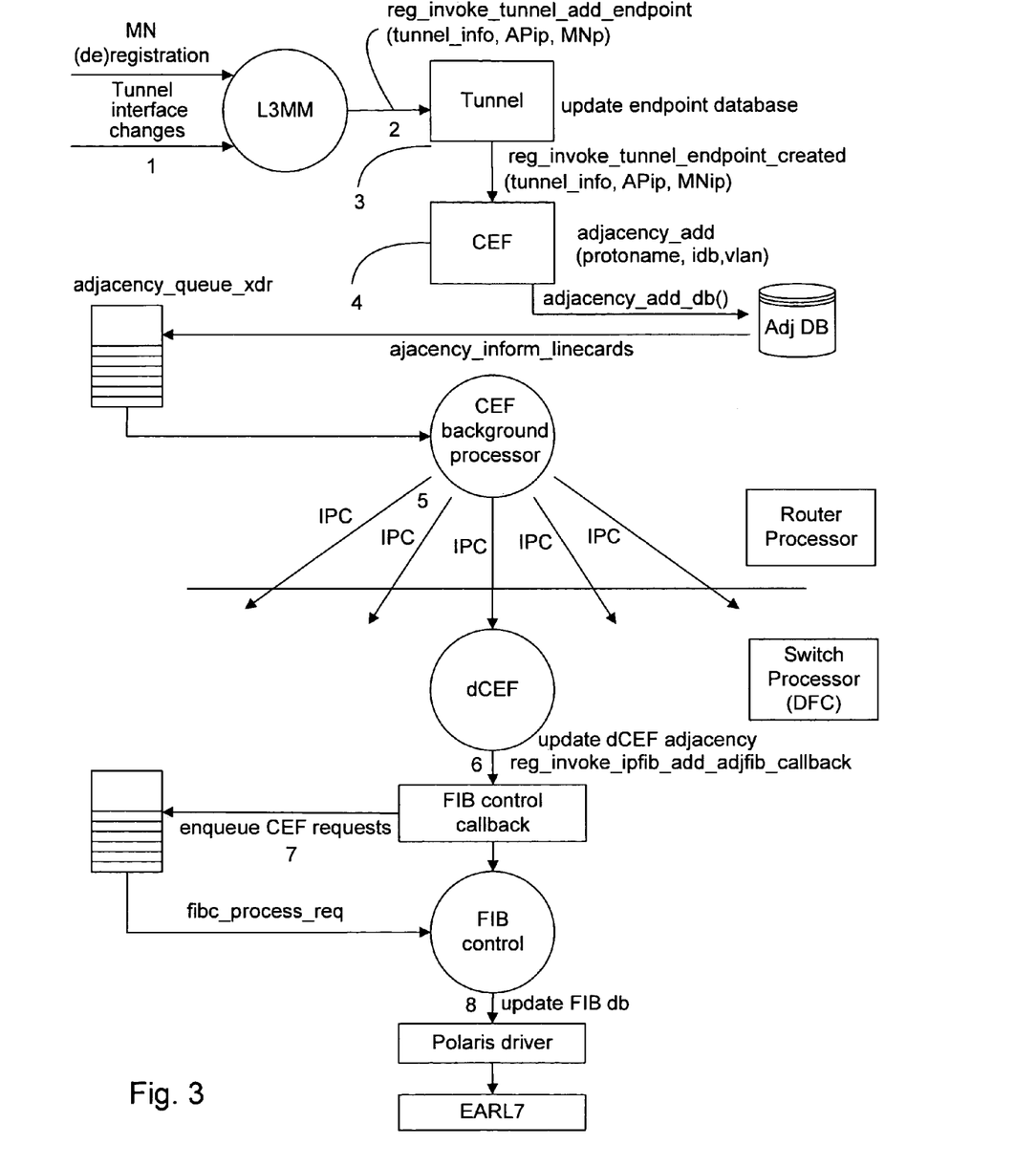
FIG. 3 gives an overview of how tunnel endpoint and encap adjacency is created and distributed.
Figure 4:
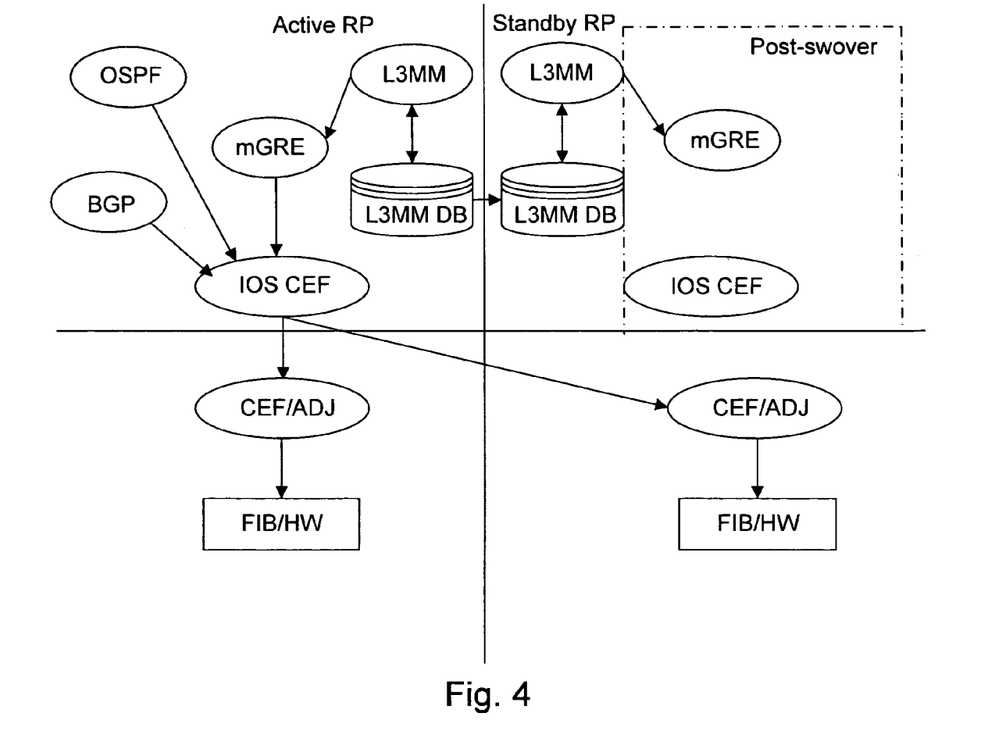
FIG. 4 shows a switchover model data path.

For example, in FIG. 2, the same underlay AP1 address 20.1.1.1 is used for tunnel traffic to reach MN1 and MN2. On each AP, there can be a maximum of 16 p2p GRE tunnels to CS, and the (#APs*16) p2p tunnel interfaces on the CS form 16 mGRE tunnel interfaces. Each mGRE tunnel defines a wireless network domain. Different set of features, Access Control Lists (ACLs) and QoS policies can be configured on individual mGRE tunnel interface and applied to MNs grouped by the wireless network domain.

FIG. 2 shows a topology for a tunneling network according to an embodiment of the present invention. In FIG. 2, two access points associated with mobile nodes MN1 and MN3 are endpoints of the mGRE tunnel (T1) with logical IP subnet 172.0.0.0/8. MN2 and MN4 are access points and endpoints of another mGRE tunnel (T16) with logical subnet 182.0.0.0/8.

When MN registers with L3MM on CS, L3MM notifies tunnel code to create a tunnel endpoint. This will trigger a routing entry, such as one of the Cisco Express Forward (CEF) routing entry format, to be created for the MN IP address. If this is the first MN to the AP, an encap adjacency is created with IP_DA=APip, and IP_SA=Tunnel-src-ip. For egress traffic, all MNs (endpoints) belong to the same AP share one tunnel encap adjacency. For ingress traffic, it works the same as p2p GRE tunnel, i.e. all ingress traffic (from different endpoints) has one same decap adjacency for one mGRE tunnel.

APs are the actual GRE tunnel entry and termination points. When a GRE encapsulated packet reaches AP, AP strips off the outer IP and GRE header. The inner IP_DA tells AP which MN the packet should go. In a preferred embodiment, a Forwarding Information Base (FIB) control module retrieves tunnel information from a separate Inter-Process Communication (IPC) channel. Hardware adjacencies are created based on tunnel information and the tunnel source and destination are fixed. With multiple GRE support only the tunnel source is known from the configuration since tunnel destination/endpoints can be added or removed dynamically. In this case, the control module programs the hardware adjacencies for tunnel endpoints by listening to CEF adjacency updates.

Stateful Switchover

A Stateful Switchover (SSO) mode of operation provides reliable redundancy of data structures used to maintain MN and access point AP connections so that "failover" or switchover from an active processor to a standby processor can occur without, or with minimal, loss of operation. Non-stop forwarding is used to facilitate a switchover whereupon software and hardware states are synchronized so that, in a preferred embodiment, authentication, authorization and registration states of MNs and APs are preserved. Control and data plan information of a distributed forwarding mobile network is preserved across a switchover and event states are used to update information at a standby process.

A Wireless LAN Context Control Protocol (WLCCP) is used between a WDS process and an AP. WLCCP is used for signaling control information between an AP and a WDS subsystem residing on a Wireless LAN Services Module WLSM, or "blade." WLCCP is used by the AP and WDS to communicate information about authentication and registration of the AP, itself, and mobile nodes coming in through an AP. The WDS learns of events in the wireless network such as the registration, de-registration, or roam of a mobile node through WLCCP messages.

Another protocol that is used between a WDS and the L3MM (supervisor) is Link Control Protocol (LCP). Events are relayed by the WDS to the L3MM. After the L3MM processes these requests, and replies back (again via LCP) to the WDS, the transaction is completed with the AP/MN. This is also true of events that may originate on the L3MM side of the system. Redundancy of the LCP protocol helps to maintain authentication/registration states of all APs and MNs.

A third protocol called "Inter L3MM Checkpoint" (IL3MM-CF) is used from an active L3MM to a standby L3MM. The protocol is used to transfer/sync data from the active router to the standby router. It provides a complementary function to the redundancy facility (RF). This is essentially a one way data transfer protocol.

In an SSO mode, the standby processor is stateful. IOS is fully initialized and different HA-aware (i.e., application is aware whether it is functioning as an active or standby mode) components use the Redundancy Facility (RF) and Checkpointing Facility (CF) infrastructure to sync their state. In order to achieve minimal (best case 0) packet loss on switchover, the standby supervisor's hardware (EARL) is programmed with the same forwarding tables as the active supervisor. On switchover, the newly active processor is able to immediately resume forwarding traffic in hardware. On switchover, the line cards (LCs) are not reset, and neither are their ports reset. This allows for un-interrupted traffic flow. Ideally, the data path should remain unaffected and the switchover should be as transparent as possible to the WDS (control path) so that switchover related changes on WDS are minimal. A preferred embodiment of the invention strives to maintain DHCP snooping database consistency. The DHCP snooping bindings are needed on the newly active processor only for command line interface (CLI) (e.g., "show" command).

Figure 5:
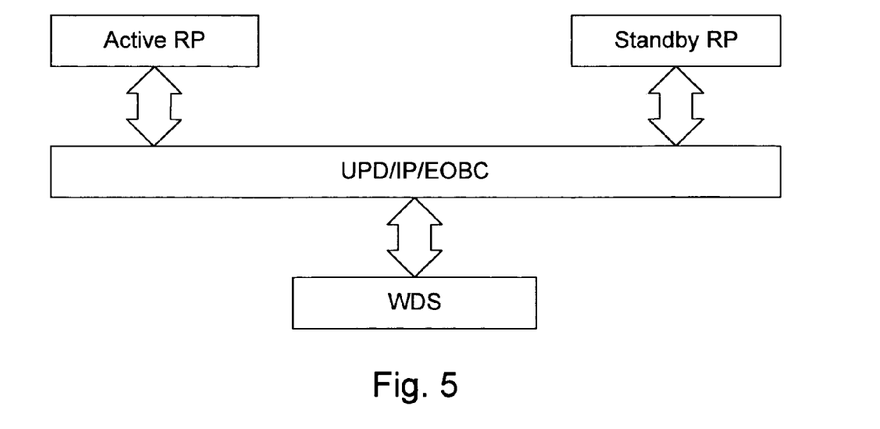
FIG. 5 illustrates UDP connectivity between L3MM and WDS.

On a stand-alone system, all data traffic to and from a MN flows through the CS. The establishment of an mGRE tunnel data path has been explained, above. FIG. 5 shows components involved in re-establishment of the data path upon SSO switchover. On the active side, as tunnel endpoints are added through a registry invocation, the mGRE code builds up an internal database of endpoints for the given mGRE tunnel. Since mGRE code in itself is not stateful, corresponding CEF forwarding lookup entries and adjacencies are not synced to the standby. The hardware forwarding tables on the standby's EARL are however in sync as the CEF updates are sent to every forwarding engine including the standby. Upon switchover, the forwarding is done by the newly active supervisor's EARL. Note that although embodiments of this invention is discussed with respect to an EARL forwarding engine, any type of hardware forwarding engine can be employed.

In a nodal NSF model, the standby SP maintains its hardware FIB entries identical to the active EARL's entries but the standby RP's CEF entries are empty. On switchover, the FIB entries on the newly active EARL are marked. When routing protocols start receiving updates, the CEF database is populated, and this information is forwarded to the FIB code. If the entry to be programmed already exists in hardware (which is typically the case), the entry is simply unmarked, allowing for un-interrupted traffic flow. After a certain period, by which time routing protocols should have re-converged, entries that are still marked are deleted. A timer is used to trigger the purge. Note that other embodiments may not require or use a nodal NSF model.

On nodal SSO switchover, the L3MM code needs to call the appropriate mGRE registry to trigger re-programming of hardware entries. This serves to bring the software state of the mGRE code in sync with the hardware programming since the mGRE code is HA-unaware (i.e., a process that is not aware of whether it is in an active or standby mode). In a preferred embodiment this causes re-building of the mGRE database. Another function performed as a result of re-programming of hardware entries is to un-mark the corresponding entries so that they don't get purged on expiration of a timer. At the hardware layer, since these entries were already in existence before switchover, the result of calling the above registry in this case will be to unmark the FIB entries. Thus the requirement for the SSO client is to make sure this registry is invoked for all MNs before the purge timer expires. The minimum value of this timer is 2 minutes, which is deemed enough for the mGRE tunnel programming to be completed. Note that other embodiments can perform the functionality in different ways, by different processes and, in some cases, specific operations (e.g., use of a registry, rebuilding the database, etc.) may be omitted or performed in a different manner while still providing maintenance of state for purposes of switchover.

In an SSO/NSF model (i.e., an NSF model using stateful switchover), the standby RP has its CEF database updated to, or in synchronization with, the active RP. Each supervisor lifetime is given a version number and the FIB entries and adjacencies are programmed in the h/w tables with this number. After switchover, the newly active RP will initially have FIB and adjacency databases that are the mirror image of the primary RP. When the switchover version number is incremented, this will cause all entries to be considered stale. Forwarding will continue as normal. As the routing protocols start to repopulate the FIB and adjacency databases, existing entries will receive the new version number, indicating that they have been refreshed. When the routing protocols signal that they are converged, a database process removes all FIB and adjacency entries that have version numbers older than the current switchover version number.

In the SSO/NSF model, when switchover occurs, since the mGRE code is not HA-aware, the above registries will need to be invoked to bring the mGRE software in sync with the hardware programming. In addition since the tunnel encap adjacencies are programmed through mGRE, and not through routing updates, these would once again need to be given to the CEF code on switchover to avoid purging at the end of routing protocol re-convergence.

A control path switchover process handles processing necessary to re-establish the control path. The goal is to make supervisor switchover as transparent as possible to the WDS. This can make the control path switchover transparent to the APs. In order to achieve this, the LCP communication should be available as soon as possible on switchover.

In order for L3MM and WDS to effectively communicate after a switchover, the LCP messaging protocol uses UDP/IP over EOBC to effect an address change. There are 3 UDP entities involved from a redundancy standpoint, as seen in FIG. 5, which shows connectivity between the L3MM and WDS. Initially the WDS learns the IP address of the L3MM through the SESSION_INIT message. Upon switchover, the WDS is informed of the L3MMs new IP address.

A preferred embodiment attempts to deliver outstanding LCP messages on both the L3MM and WDS side. LCP messages incorporate a simple request-response system. If the response for a request is not received within a predetermined amount of time the message is retried for a set amount of times. At any point, the sender may have a number of outstanding messages which are maintained in a queue, along with their retry counts. A periodic timer is used to check and re-transmit requests if needed. The message sequence number will be synced while opening the event.

Figure 6:
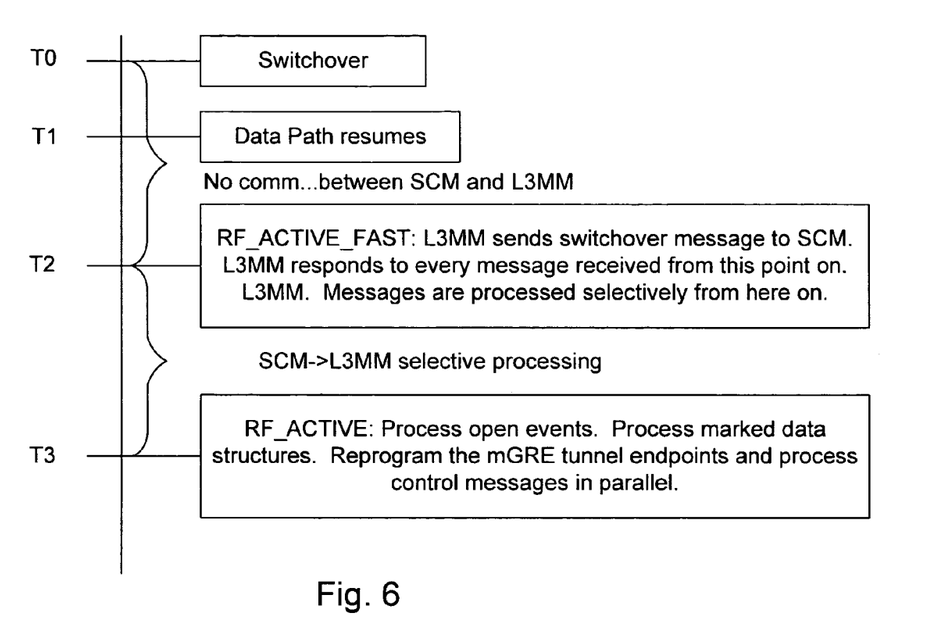
FIG. 6 shows a switchover timing diagram.

FIG. 6 shows a timing diagram for SSO switchover. In FIG. 6, the L3MM HA component is informed of switchover at RF_ACTIVE_FAST. The platform code guarantees that this RF progression is delivered to clients within 3 seconds. At this point the L3MM sends a SESSION_INIT message to the WDS with its new IP address. The WDS caches the L3MMs IP address globally. Whenever it receives a SESSION_INIT message, it compares the source IP address in the packet to the one it has cached. If there is a change, the WDS detects this message as a switchover message and interprets it differently as compared to the SESSION_INIT received from the original active (when receiving the original message, it would not have had any locally cached IP address). When the WDS receives this message, it updates the locally cached value of the IP address. This also implies that messages maintained in the LCP pending message queue would be sent with the new destination IP address from this point onwards. Till the time that the WDS is updated with the new IP address, the WDS continues to send all message retries (if any) to the old IP address. Note that the LCP session ID will remain the same through SSO switchover.

In order to reduce complexity, it is undesirable to buffer any L3MM-destined messages on the WDS. One way to avoid this is to make sure that the messages are retried through the switchover period so that the L3MM can safely reply to them. This calls for an increase in the timer values so that a 3 second period is safely covered. A timeout period of about 8 seconds is recommended for all LCP messages. This is shown in the relation:

WLCCP timeout (15s)>2×LCP timeout (8s) LCP timeout (8s)>2×time to RF_ACTIVE_FAST Given that there will typically be a lot of CPU intensive processing just after switchover, at this point it is desirable to start responding only to messages from the WDS that are of high importance. For example, each LCP speaker maintains a queue of message requests including a message ID and retry count. A periodic timer is used for re-transmission. In some cases a messages sent by the WDS may have a request or reply that is lost during switchover. With appropriate timer values it can be assumed that the message request will be retried by the WDS and finally be processed by the L3MM safely within the LCP timeout interval.

Even in a non-redundant model, the L3MM and the WDS should both be able to process identical requests, because of the support for request retry. An Event Manager is used to track the beginning and ending of a transaction on the active supervisor. This design allows for the detection of cases where the message sequence numbers are different on the newly active L3MM and the WDS.

In a switchover case where the L3MM receives a request, an event is opened, the WDS receives reply, and the event closed; then the L3MM receives request from the WDS and opens an event. Opening an event implies indicating the start of a transaction to the standby processor. The event_open message includes the context necessary to rebuild the message received. L3MM processes the message. Event state is synced to the standby as part of this message. L3MM closes the event. Closing this event indicates to the standby that this event was processed correctly.

In a case where the L3MM does not receive request then no event is opened. On switchover, the request is retried and replied to by the new L3MM.

In a case where the L3MM receives a request and processes it, the WDS does not receive a reply, and the standby L3MM does not receive sync; then the event will be open on the newly active L3MM after switchover. The information received includes all information necessary to process this information. The L3MM processes the message and replies to it. The WDS also sends retries. This is handled as in a normal case by an LCP entity.

In a case where the L3MM receives request, the standby L3MM does not receive sync, and the WDS receives a reply; then the Event Manager is used to track the event because otherwise the standby L3MM would not know of some event that was processed by active L3MM and the WDS. The recovery is essentially the same as in the previous case, except that the WDS will not send any retries. The response sent by the L3MM should be ignored by the WDS.

In a case where the L3MM receives request, the standby L3MM receives sync, and the WDS does not receive reply; then the WDS retries sending message requests. The handling on the new L3MM should be the same as in a stand-alone case.

Since the L3MM and WDS share the same LCP subsystem, at the L3MM end there will be a list of pending messages with their retry counts. The information w.r.t to these pending messages will be synced through event open messages to the standby RP. Due to the nature of the messages initiated from the L3MM, the retry counts do not need to be synced and pending message re-transmission can be started from scratch.

LCP messages are shown in Table I, below. There are 2 messages sent from the L3MM to the WDS through LCP. The first is the LCP_SESSION_INIT message, which is sent only once on switchover. If we have this message outstanding on switchover, this open event can be junked. On SSO switchover, the L3MM code would be notified that the WAM is online, and would send a LCP_SESSION_INIT message. The normal sequence of events would follow.

The other message is the LCP_MN_IP_ADDR_CHANGE message. This is triggered by an external event from DHCP snooping code. If the event encapsulating this message exchange is closed, nothing needs to be done. If the event is not closed, the L3MM will re-transmit the message.

After RF_ACTIVE_FAST (Note: processes with "_FAST" appended to the process name indicate that the process is doing minimal processing during switchover) the WDS is able to send message requests to the L3MM. A preferred embodiment strives for minimum processing at an RF_ACTIVE_FAST (i.e., switchover) stage, and postpones as much as possible to an RF_ACTIVE (i.e., non-switchover) stage. Table I describes how messages are handled between these 2 stages:

TABLE I

Message processing between RF_ACTIVE_FAST and RF_ACTIVE

| LCP msg type received | Req/rsp type | Action | Reason |
|---|---|---|---|
| LCP_SESSION_INIT | Rsp | Process imm/drop | Process if this message is received in response to a SESSION_INIT switchover message, drop otherwise. If response to switchover message, this indicates connectivity establishment with WDS. |
| LCP_AP_UPDATE | Req | Drop | WDS will relay the failure to AP. AP will retry after an interval |
| LCP_AP_REMOVE | Req | Drop | WDS will retry |
| LCP_MN_UPDATE | Req | Drop | MN will retry |
| LCP_MN_REMOVE | Req | Drop | This message will be sent only once. It needs to be processed on the L3MM |
| LCP_MN_IP_ADDR_CHANGE | Req | Process imm. | This event may be generated by IOS only once, and should be processed immediately. If there is an open addr. Change event for this MN, it should be ignored. |
| LCP_MN_IP_ADDR_CHANGE | Rsp | Process imm. | This is the response to the previous message, and should be processed. |
| LCP_SESSION_REFRESH | Req | process imm. | The WDS will assume L3MM failure if not replied to; replying to this message is critical. |

TABLE II

IOS Event processing between RF_ACTIVE_FAST and RF_ACTIVE

| IOS Event Received | Action taken |
|---|---|
| mGRE tunnel interface addition | N/A (no config allowed till RF_ACTIVE completes) |
| Tunnel IP address change | Same as above |
| Tunnel mode change to non gre multipoint | Same as above |
| Wireless Network ID change | Same as above |
| WD: trusted to non-trusted change | Same as above |
| WD: non-trusted to trusted change | Same as above |
| Tunnel Interface Up Event | A tunnel interface can go up or down in 2 situations: 1. Administratively: This is not possible during this interim 2. Link up/down: This is possible only if the tunnel source goes up/down. IOS is not notified of such events till we reach RF_ACTIVE. Given these conditions, at RF_ACTIVE, when the media layer HA code brings up the tunnel interfaces, the mGRE programming will be done through the same code path as it is done on the active. |
| Tunnel Interface Down Event | Same as above |
| Tunnel interface removed | N/A (no config allowed till RF_ACTIVE completes) |

Figure 7:
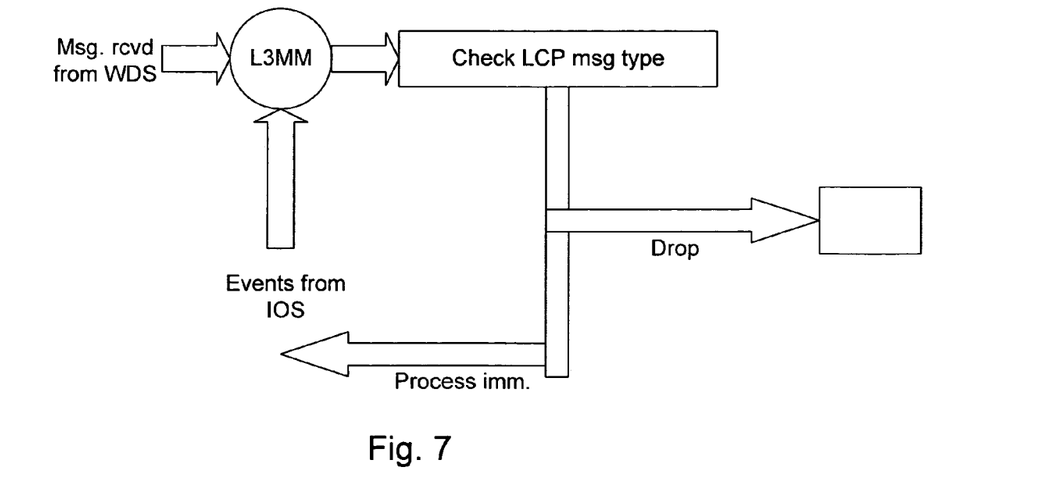
FIG. 7 shows message processing.

FIG. 7 shows message flow for the time window between RF_ACTIVE_FAST and RF_ACTIVE. Between RF_ACTIVE_FAST and RF_ACTIVE only the WDS keepalives (e.g., a heartbeat message from the WDS to the L3MM) and IP address update messages are processed. The latter are expected to be very rare, and for the purposes of this design can be considered to have negligible impact. All other messages/events are expected to be retried by the WDS. This design approach significantly reduces the number of messages that need to be processed immediately.

Although the invention has been described with respect to specific embodiments thereof, these embodiments are merely illustrative, and not restrictive of the invention.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

What is claimed is:

1. A method for preserving mobility network connections in a route processor having first and second processors for performing routing functions, the method comprising
   using the first processor to establish connections through tunnels associated with devices in the mobility network;
   recording a plurality of route events as a plurality of states, the route events received from the mobility network for route events associated with devices, wherein a protocol action is identified as a route event;

initiating a switchover from the first processor to the second processor;
using the plurality of states to reproduce forwarding information and program hardware for the second processor, wherein a state in the plurality of states include an authentication state associated with an authentication event;
reconnecting control messaging to maintain the tunnels associated with the devices; and
using the second processor and the reproduced forwarding information to preserve the mobility network connections through the tunnels subsequent to initiating a switchover, wherein reconnecting the control messaging comprises preserving authentication information for the devices such that the devices do not have to re-authenticate subsequent to the switchover.

2. The method of claim 1, wherein the mobility network includes a wireless network.

3. The method of claim 1, wherein a route event includes a message request.

4. The method of claim 1, wherein a route event includes processing a message.

5. The method of claim 1, wherein a route event includes a reply in response to a message request.

6. The method of claim 1, wherein a plurality of communication processes execute within the mobility network, the method further comprising
using a protocol for data transfer between two of the plurality of communication processes; and
identifying a protocol action as an event.

7. The method of claim 1, wherein reconnecting the control messaging comprises preserving authentication information for the devices such that the devices do not have to re-authenticate subsequent to the switchover.

8. The method of claim 1, wherein reconnecting the control messaging comprises preserving registration information for the devices such that the devices do not have to re-register subsequent to the switchover.

9. The method of claim 1, wherein reconnecting the control information comprises maintaining a tunnel source and tunnel destination information.

10. The method of claim 1, wherein the tunnels are associated with one or more wireless devices.

11. An apparatus for preserving mobility network connections in a route processor having first and seccnd processors for performing routing functions, the apparatus comprising
a processing system;
a machine-readable medium including instructions for performing the following:
using the first processor to establish connections through tunnels associated with devices in the mobility network;
recording a plurality of route events as a plurality of states, the route events received from the mobility network for route events associated with devices, wherein a protocol action is identified as a route event;
initiating a switchover from the first processor to the second processor;
using the plurality of states to reproduce forwarding information and program hardware for the second processor, wherein a state in the plurality of states includes an authentication state associated with an authentication event;
reconnecting control messaging to maintain the tunnels associated with the devices; and
using the second processor and the reproduced routing information to preserve the mobility network connections through the tunnels subsequent to initiating a switchover, wherein reconnecting the control messaging comprises preserving authentication information for the devices such that the devices do not have to re-authenticate subsequent to the switchover.

12. The apparatus of claim 11, wherein reconnecting the control messaging comprises preserving authentication information for the devices such that the devices do not have to re-authenticate subsequent to the switchover.

13. The apparatus of claim 11, wherein reconnecting the control messaging comprises preserving registration information for the devices such that the devices do not have to re-register subsequent to the switchover.

14. The apparatus of claim 11, wherein reconnecting the control information comprises maintaining a tunnel source and tunnel destination information.

15. The apparatus of claim 11, wherein the tunnels are associated with one or more wireless devices.

16. An apparatus for preserving mobility network connections in a route processor having first and second processors for performing routing functions, the apparatus comprising
means for using the first processor to establish connections through tunnels associated with devices in the mobility network;
means for recording a plurality of route events as a plurality of states, the route events received from the mobility network for route events associated with devices, wherein a protocol action is identified as a route event;
means for initiating a switchover from the first processor to the second processor,
means for using the plurality of states to reproduce forwarding information and program hardware for the second processor, wherein a state in the plurality of states include an authentication state associated with an authentication event;
means for reconnecting control messaging to maintain tunnels associated with the devices; and
means for using the second processor and the reproduced routing information to preserve the mobility network connections through the tunnels subsequent to initiate a switchover, wherein reconnecting the control messaging comprises preserving authentication information for the devices such that the devices do not have to re-authenticate subsequent to the switchover.

17. A computer-readable medium including instructions for preserving mobility network connections in a route processor having first and second processors for performing routing functions, the computer-readable medium comprising
one or more processors; and
logic encoded in one or more tangible media for execution by the one or more processors and when executed operable to:
use the first processor to establish connections through tunnels associated with devices in the mobility network;
record a plurality of route events as a plurality of states, the route events received from the mobility network for route events associated with devices, wherein a protocol action is identified as a route events;
initiate a switchover from the first processor to the second processor;
use the plurality of states to reproduce forwarding information and program hardware for the second processor, wherein a state in the plurality of states includes an authentication state associated with an authentication event;
reconnect control messaging to maintain the tunnels associated with the devices; and use the second processor and the reproduced routing information to preserve the mobility network connections through the tunnels subsequent to initiating a switchover, wherein reconnecting the control messaging comprises preserving authentication information for the devices such that the devices do not have to re-authenticate subsequent to the switchover.

18. The computer-readable medium of claim 17, wherein the logic operable to reconnect the control messaging comprises logic operable to preserve authentication information for the devices such that the devices do not have to re-authenticate subsequent to the switchover.

19. The computer-readable medium of claim 17, wherein the logic operable to reconnect the control messaging comprises logic operable to preserve registration information for the devices such that the devices do not have to re-register subsequent to the switchover.

20. The computer-readable medium of claim 17, wherein the logic operable to reconnect the control information comprises logic operable to maintain a tunnel source and tunnel destination information.

* * * * *